Jan. 31, 1928. 1,657,941
P. T. SHARPLES ET AL
PROCESS AND APPARATUS FOR THE REFINING AND PURIFYING OF LIQUIDS
Filed April 2, 1924
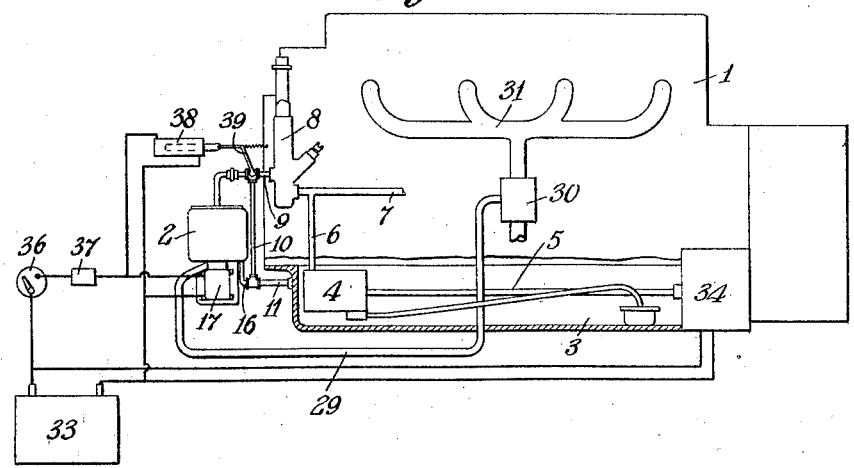
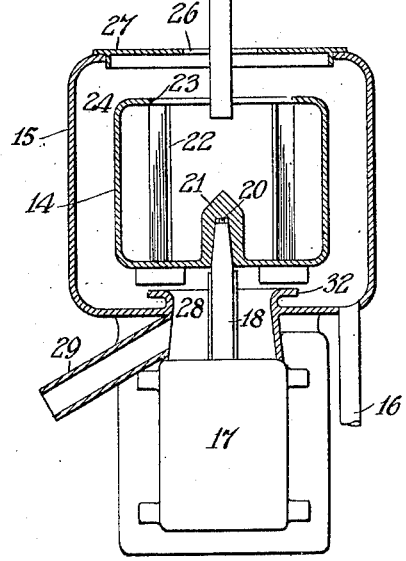
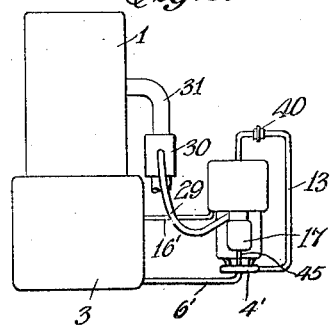

Patented Jan. 31, 1928.

1,657,941

UNITED STATES PATENT OFFICE.

PHILIP T. SHARPLES, OF MERION, AND LEO D. JONES, OF PHILADELPHIA, PENNSYLVANIA, ASSIGNORS TO THE SHARPLES SPECIALTY COMPANY, OF PHILADELPHIA, PENNSYLVANIA, A CORPORATION OF DELAWARE.

PROCESS AND APPARATUS FOR THE REFINING AND PURIFYING OF LIQUIDS.

Application filed April 2, 1924. Serial No. 703,789.

Our invention relates to processes and apparatus for the refining and purifying of a liquid particularly by the removal therefrom of solid matter, or immiscible liquids, or volatile or low boiling miscible or soluble substances, or by the removal of any two or more of such substances, or other objectionable substances.

We propose by our invention to remove solid particles and immiscible liquids from a desired liquid by a process and by apparatus whereby the removal of solid matter will be effectual and certain and the amount of solid matter removed or being removed will not alter the degree of completeness or effectiveness of the removal of such solid matter, and to remove any remaining immiscible liquid and volatile, low boiling, soluble, or other undesirable substances by such means and method as will insure complete or effective removal thereof without undesirably affecting the desired product; or we propose to so remove such of said substances as it may be desirable to remove.

As a more specific application of our invention we propose to remove solid matter and immiscible liquid from a desired liquid by passing a mixture thereof through a centrifugal machine or to remove other objectionable constituents by appropriately treating the substance under treatment while it is in a finely divided state, taking advantage of the fact that if the substance has been passed through a centrifugal machine, for example, to remove solid matter, the substance is reduced to a finely divided state by being centrifugally discharged from such machine. Treatment of the substance while in a finely divided state may consist in bringing into contact therewith a relatively large quantity of air or gas that may or may not be heated in order to effect thereby an evaporation or volatilization of constituents that are to be removed, at a temperature lower than that at which such substances would be evaporated or volatilized in a still and lower than the temperature at which any constituent of the desired substance would be altered or removed from the desired substance, or any agent, such, for example, as an oxidizing agent, with which it is desired to treat the desired substance may be so applied thereto. And if the substance so treated has been passed through a centrifugal machine we propose to effect the circulation of the air, gas or other agent, if desired, by means of that machine or a part thereof.

A very important concrete application of our invention resides in the refining and purification of oil that has been used for lubrication in order to restore it to a useful condition. And from the foregoing it will be immediately apparent that our invention is peculiarly adaptable to such restoration of oil that has been and is being used in the lubrication of internal combustion engines because such oil contains, as is well known, solid particles of metal resulting from wear and abrasion of parts lubricated, solid particles of carbon resulting from incomplete combustion, solid particles of road dust, immiscible though perhaps partly emulsified water due to condensation from the atmosphere and products of combustion, light or low boiling oils such as gasoline and kerosene due to leakage past the pistons and cracking of the lubricant, and sometimes other objectionable substances. It has been proposed to restore such oils to a useful state by filtering out the solid particles admixed therewith and perhaps some water and by distilling off the low viscosity oils by which it is diluted and perhaps any remaining water, but such methods are subject to certain defects. The filters employed have proved inadequate to remove the solid material or they rapidly become clogged and in any event the degree of filtration effected by them varies with the length of time the filter has been in use and the filters ultimately become clogged and cease to function. When a filter is first put into use the finer particles of solid matter are not removed from the oil and if fine particles are eventually removed as the use of the filter continues, the filter will invariably become clogged and inoperative; and the resulting pressure on the filter will cause it to puncture and the previously filtered-out material will go back into the lubricating oil. The distilling devices employed in such methods are, particularly in connection with automobile engines, so small that they are either inoperative or the temperatures that must be employed are so high as to injure the lubricating oil, and further the control of such distilling devices is so uncertain that undesirable liquids may not be distilled off, or if they are distilled off, the lubricating oil may be injured or otherwise undesirably altered in character since the temperature required to distill off, in such stills, the undesirable oil of the highest boiling point, may be sufficient to distill off or alter that part of the lubricating oil having lower boiling points. As such distilling devices become encrusted their effectiveness diminishes and finally they become wholly inoperative.

As oil that has been or is being used for the lubrication of internal combustion engines contains a number of objectionable substances that fall within those classes of substances, above mentioned, that we propose to remove from a desired substance in accordance with our invention, we shall describe, for the purpose of assisting in the understanding of our invention, an application of our invention to the purification of such lubricating oil, but we do not intend that our invention shall be limited to that illustration of the application of our invention.

In order to restore lubricating oil of an internal combustion engine by the application of our invention we propose to pass the oil through a centrifugal separator to effect the removal of solid particles of metal, dust and carbon, the breaking down of any existing emulsion, and the removal of water. And we propose to reduce the oil so clarified to an extremely finely divided state by centrifugally discharging it from such a separator and to bring into contact with the oil while in such a state so large a quantity of air or other gas, which may or may not be heated, that the undesirable oily constituents thereof, and any unremoved water, will be completely evaporated without undesirable alteration of the desired oil. And as above noted the circulation of the air or gas may be effected by or from the rotation of the separator and if any further treatment of the oil is desired the appropriate reagent therefor may be substituted for the air or gas. And in order that such a centrifugal separator may be effective in so clarifying the oil and in so dispersing it that the evaporation or volatilization of undesirable liquids may occur, the separator is driven, in accordance with our invention, from the engine but in such a way that the separator will rotate at an effective speed regardless of the speed of the engine, this highly desirable condition being secured, in accordance with our invention, by so driving the separator that the ratio of the engine speed to the separator speed and the ratio of the engine acceleration to the separator acceleration may vary.

In the drawings,

Fig. 1 is a side elevation, with parts broken away, of apparatus containing one embodiment of our invention as applied to an internal combustion engine and whereby our invention may be practised;

Fig. 2 is a detailed view; and

Fig. 3 shows a modification of the construction shown in Fig. 1.

It being understood that the apparatus hereinafter described is described merely for the purpose of illustrating one of many embodiments of our invention and for illustrating one exemplary application of our process, it will be seen that in Fig. 1 there is indicated at 1 an internal combustion engine and at 2 a centrifugal lubricant purifier. The oil of the engine 1 is collected in a reservoir, such as the casing 3, and delivered by the pump 4 to the purifier from which it may be returned to the reservoir or casing 3. A counter shaft 5 of the engine 1 drives the pump 4 and forces oil into the pipe 6 from which the pipe 7 carries the oil to the bearings and other parts of the engine that are to be lubricated. Oil also passes from the pipe 6 to the oil pressure controlling device 8 that may be of any well-known construction whereby oil that is not needed for lubrication purposes is released from the oil pressure system to run back to the oil reservoir by the pipes 9, 10 and 11. However, such excess oil running to the reservoir through these pipes may, by means of the three way valve 12 be caused to run into the purifier through the feed pipe 13. The purifier includes the centrifugal bowl 14 enclosed in the casing 15 into which clarified oil is discharged, as hereinafter described, and from which the oil runs through the pipe 16 back to the pipe 11 and thence into the oil reservoir. The motor 17 has a shaft 18, the tapered end of which fits into a recess in the bottom of the bowl 14, and a slot in the end of the shaft 18 engages a ridge 20 within said recess, so that the bowl partakes of the speed of the motor. Oil discharged from the pipe 13 may be directed toward the sides of the bowl 14 by the inclined surface 21, and wings 22 may be employed to insure that the oil will partake of the speed of the bowl 14. The motor will rotate the bowl 14 at such speed, for example 8,000 R. P. M., as may be necessary to cause solid particles and, at least a part of any water that may be in the oil, to be thrown outwardly against the inner wall of the bowl and oil properly freed of such contaminating products will pass over the weir or dam 23 of the bowl. The oil passing out of the bowl will, by reason of the high speed of the bowl, be dispersed in finely divided particles in the space 24 between the bowl 14 and the casing 15. Vanes 25 on the bottom of the bowl 14 will cause a circulation of air or gas up through the passage 24 and out through the opening 26 in the cover 27 of the casing 15 and the contact of the finely divided particles of clarified oil with a relatively large amount of gas or air in the passage 24 will effect an evaporation of such oily substances as should be removed from the clarified oil and also of any water that was not held in the centrifugal bowl 14. Air or gas circulated by the wings 25 is drawn into the opening 28 in the bottom of the casing 15 and such gas or air may be heated as by drawing it through the pipe 29 that leads from a stove 30 on the exhaust pipe 31 of the engine. Drawing of air or gas through the opening 28 will also tend to keep the motor 17 sufficiently cool. A rim 32 prevents escape of oil through the opening 28 and the clarified oil, freed by distillation of undesirable oily substances, or any water that may be in it, passes into the pipe 16.

From the foregoing it will be apparent that our centrifugal purifier first withdraws from the oil solid substances and the bulk of any water that may be present therein, and then it disperses the oil so clarified throughout a relatively large body of air or gas that may be heated and, if necessary, the purifier produces a current of such gas or air, and the action of such gas or air upon the highly dispersed clarified oil is such that undesirable oily constituents thereof will be evaporated at temperatures far below their boiling points, the temperature at which those undesirable constituents would be evaporated in a still being 200° F. or 300° F. higher than the temperature at which they are evaporated while the clarified oil is dispersed.

The purifier bowl is preferably driven at a substantially constant speed that is ordinarily greater than the maximum speed of the engine and many times greater than the idling speed of the engine. If the purifier is driven from the engine, as is preferable in the case of a purifier for lubricating oil of an automobile engine, a rigid connection between the engine and purifier would result in its extremely great acceleration when the engine was rapidly accelerated as so frequently occurs in ordinary operation. Therefore, while various means may be employed, we show herein, means whereby the purifier may be driven from the engine in such a way that the ratio of engine acceleration to purifier acceleration may vary and the ratio of engine speed to purifier speed may vary, all to the end that such practical difficulties may be avoided as arise by reason of the acceleration of an engine that is driving another part, namely, the purifier, at a much higher speed. To this end the motor 17 is driven from the storage battery 33 that derives its energy from the dynamo 34 (that may be regulated in any well-known way) that is driven from the counter shaft 5 of the engine.

The supply circuit of the motor contains a timing device 37, of any well-known construction, that is so designed that when the circuit is energized the timing device will maintain the circuit for a given interval and then break it. Upon closing the switch 36 the timing device is energized, power is supplied to the motor 17 and to the solenoid 38, that operates the three way valve 12 by means of the lever 39.

From the foregoing it will be apparent that the specific process and apparatus above described fall within and constitute one application of and contain one embodiment of our invention whereby our process may be practised, such process and apparatus being capable of purifying or refining oil by the removal of solid matter and of heavier liquid constituents and by the evaporation of undesirable oily or other liquid constituents, such evaporation being accomplished preferably by taking advantage of the highly dispersed state into which the clarifying operation puts the substance being treated. But the clarifying operation may be carried out without being followed by further purifying operations such as the distillation or evaporation herein described. And the distilling or evaporating operation may be carried out without being preceded by a clarifying operation since the manner of putting the substance to be treated in a highly dispersed state and the degree of dispersion may vary and the substance may be put in such state in other ways than by its discharge from a centrifugal bowl. It is also obvious that while we have shown means operated by the clarifier whereby circulation of air or gas through the dispersed substance may be effected, other means and methods may be employed whereby a large volume of vapor absorbing medium, such as air or gas, may be brought into contact with the dispersed substance. And in addition to or apart from the evaporation or volatilization effected while the oil is in a finely divided state, a chemical treatment of the oil may be effected while it is in that state by bringing an appropriate reagent into contact therewith, for example, by substituting a particular gas for the air used to effect evaporation or volatilization.

While separating devices are available that will continuously discharge both solid and liquid material, we have shown for the purpose of illustrating our invention a separator of what may be called the clarifier type in which solid material and frequently some water are retained in the rotating bowl. But the bowl shown may be quickly and completely cleaned and it is to be noted that unlike a filtering device our clarifier will produce the same degree of clarification from the time operation is started with the bowl clean up to the time that the bowl is cleaned out again. By undoing the union coupling 40 and removing the pipe 13 and the cover 27 the bowl 14 may be taken out and all solid matter and water removed completely and in a simple manner after which the cleaned bowl may be put back in operative position; or, the bowl, being so removable, may be replaced by a new bowl as a matter of repair or to dispense with the trouble of cleaning the bowl.

While we have described in great detail our process and apparatus embodying our invention and capable of use in the practice thereof we do not intend that our invention be limited to such details but we intend that it shall include such variations and modifications as fall within the hereunto appended claims. In this connection we point out that in separating solid particles and immiscible liquid from a given liquid the separation is most effective when the substance being treated is highly fluid and that in separtion of such substances from lubricating oil of an internal combustion engine this condition of fluidity is attained by retaining in the oil the heat of the engine and the substances of lower boiling point that dilute and reduce the viscosity of the oil during the time that such solid and other immiscible matter is being removed. And the evaporation of diluting substances of lower boiling point that is being effected at a temperature below that at which those substances would entirely evaporate in a still, by bringing into intimate contact with the oil large quantities of air or gas at or above atmospheric temperature, is furthered by retaining in the oil the heat of the engine. When our invention is applied to the purification of the lubricant in the lubricating system of an internal combustion engine, as in the specific embodiment of our invention, herein described, for the purpose of illustrating the same, it is not necessary to operate the purifier during all of the time that the engine is in operation because all of the lubricant in the system will be circulated and recirculated through the purifier several times during a few minutes of operation and although a single passage of contaminated oil through the purifier will ordinarily suffice to restore it to substantially its original condition, such recirculation will insure that the oil will be restored to a condition in which it will fulfill every requirement. And thus operation of the purifier for a few minutes each day will insure that the oil will be in effective and uniform condition instead of being at first perhaps too viscous and later greatly lacking in viscosity and greatly contaminated with solid particles as occurs when oil is used for some time without purification and then replaced with fresh oil. Circulation of air or other gas through the dispersed liquid discharged from the centrifuge may be effected in ways other than by the use of vanes on the centrifuge as the mere rotation of the centrifuge will effect a circulation of air through the dispersed liquid; and air or gas may be brought into contact with the dispersed liquid merely by dispersing the liquid in or into or within the air or gas; and dispersion of the liquid may be effected otherwise than by its discharge from a centrifuge. In other applications of our process and other uses of our apparatus the immiscible or solid or heavier material removed from a given liquid may be the desired product and such substances will therefore be saved when they are removed from the bowl either manually or by centrifugal force in the event that a bowl of any known type that constantly discharges such substances is employed. Or the evaporated constitutents of the liquid may be the desired substances, in which event, they will be collected in any known manner. Under such circumstances the liquid that is discharged from the bowl or that part thereof that is ultimately collected after having been dispersed, in the specific illustrative example of our invention herein described, would constitute the contaminating substance and the heavier substances or the evaporated substances or both, would be the desired substances.

In Fig. 3 we have shown a modification of the specific embodiment of our invention herein described, wherein the shaft 45 of the motor 17 is extended downwardly and drives a pump 4' that is supplied with lubricant from the engine lubricating system by the pipe 6' that leads from the lubricant reservoir 3 of the engine. The pump 4' delivers oil through the pipe 13' to the purifier. The motor is controlled by switching mechanism that may or may not include the time controlled element, such as the timing device 37. Purified oil is returned to the reservoir 3 by the pipe 16'. Oil may be supplied to the purifier in any way and in the arrangement shown in Fig. 1 the lubricant flowing to the purifier is only that part of the lubricant that would in any event flow by gravity back to the oil reservoir as not being necessary to the lubrication of the engine, but in the arrangement shown in Fig. 3 it is not necessary that the engine shall be running and operating pump 4 because the pump 4' will raise the oil to a point where it will, as in the arrangement shown in Fig. 1, be fed by gravity to the purifier, although it is preferable in either case that the oil in the lubricating system should be hot. In both the arrangement shown in Fig. 1 and the arrangement shown in Fig. 3 the flow of lubricant to the purifier begins simultaneously with the operation of the purifier, upon the closing of the motor switch; and the pump that sends the lubricant to the purifier in both the arrangement shown in Fig. 1 and the arrangement shown in Fig. 3, is operated by energy derived from the engine as in the latter arrangement the engine charges the battery that operates the motor 17. The gas-circulating vanes 25 may be dispensed with if the skin friction of the rotating bowl 14 causes sufficient circulation of air or gas in the passage 24.

What we claim and desire to secure by Letters Patent is:

1. In combination with an internal combustion engine having a lubricating system, a centrifugal for removing solid particles and water from lubricant and so discharging the lubricant as to reduce it to a finely divided state, means for feeding lubricant of said system to said separator, means for bringing relatively large quantities of gas into contact with the lubricant while in said state, and means for returning the lubricant so treated to said lubricating system.

2. In combination with an internal combustion engine having a lubricating system, a centrifugal purifier, means for feeding lubricant of said system to said centrifugal purifier, and means for bringing a relatively large quantity of gas into contact with the lubricant discharged from said centrifugal purifier.

3. In combination with an internal combustion engine having a lubricating system, a centrifugal for removing solid particles and water from the lubricant and so discharging the lubricant as to reduce it to a finely divided state, means for feeding lubricant of said system to said centrifugal, and means operated from said centrifugal for bringing relatively large quantities of gas into contact with the lubricant while in said state.

4. In combination with an internal combustion engine having a lubricating system, a centrifugal bowl having a weir over which lubricant of said system freed of heavier contaminating substances is centrifugally discharged, a chamber receiving the lubricant so discharged, and means whereby rotation of said bowl circulates gas through said chamber.

5. In combination with an internal combustion engine having a lubricating system, a centrifugal bowl having a weir over which lubricant of said system freed of heavier contaminating substances is centrifugally discharged, a chamber receiving the lubricant so discharged, and means for circulating relatively large quantities of gas at or above atmospheric temperture through said chamber.

6. In combination with an internal combustion engine having a lubricating system, means for centrifugally separating heavier contaminating substances from lubricant of said system, means for evaporating from the lubricant so purified contaminating substances of lower boiling point at a temperature below the boiling point of said substances at atmospheric pressure, and means whereby oil so purified is returned to said system.

7. In combination with an internal combustion engine having a lubricating system, means separate from and driven from said engine for finely dispersing lubricant of said system into a mist-like form, means for bringing relatively large quantities of gas at or above atmospheric temperature into contact with the dispersed lubricant to evaporate from the lubricant substances of lower boiling point, a collecting chamber for purified oil, and oil return connections between said chamber and said system.

8. In combination with an internal combustion engine having a lubricating system, means for removing heavier contaminating substances from lubricant of said system and for finely dispersing said lubricant, and means for bringing the lubricant so dispersed into contact with relatively large quantities of gas to evaporate from the lubricant contaminating substances of lower boiling point.

9. In combination with an internal combustion engine having a lubricating system, a chamber, a rapidly rotating member driven from said engine, and means for feeding lubricant of said system to said member to effect dispersion of the liubricant as it is thrown therefrom, means separate from said engine for flowing gas through said chamber, and means for returning to said system lubricant collected in said chamber.

10. In combination with an internal combustion engine having a lubricating system, a chamber, a rapidly rotating member separate from said engine, and means for feeding lubricant of said system to said member to effect dispersion of the lubricant as it is thrown therefrom, and means separate from said engine whereby rotation of said member brings a relatively large quantity of gas into contact with said dispersed lubricant.

11. In combination with an internal combustion engine having a lubricating system, centrifugal means driven from said engine for reducing lubricant of said system, while it retains the heat of the engine, to a finely dispersed state, means for flowing in contact with the lubricant so dispersed relatively large quantities of gas heated by said engine, and means for collecting and returning the lubricant to said system.

12. In a centrifugal machine, a centrifugal bowl of the type whereby a mixture is separated into constituents and a constituent is discharged in a finely divided state, a chamber into which said constituent is so discharged and collected, said chamber having an outlet for said constituent, and means for maintaining a flow through said chamber and in contact with said constituent while it is in finely divided state of gas of suitable character to effect a desired change in said constituent.

13. In a centrifugal machine, a centrifugal bowl of the type whereby a substance is subjected to the influence of centrifugal force to effect a change therein and to discharge the substance in a finely divided state, a chamber into which said substance is so discharged and collected, said chamber having an outlet for said substance, and means for controlling the condition of the substance while it exists in such finely divided state comprising means for maintaining a flow of suitable gas in contact with the substance while it is in said state in said chamber.

14. In combination with an internal combustion engine having a lubricating system, a centrifugal purifier for lubricant of said system, a generator driven by said engine, a motor for said purifier and electrically connected to said generator, and a storage battery, electrically connected to said generator and said motor.

15. In combination with an internal combustion engine having a lubricating system and having an electrical system including a storage battery, a centrifugal purifier for the lubricant in said system, and a motor for operating said purifier at substantially constant speed and electrically connected to said battery.

16. In combination with an internal combustion engine comprising the power source of an automotive vehicle and having a lubricating system, a centrifugal lubricant purifier, and means for driving said purifier by energy derived from said engine at a speed substantially independent of the speed of the engine.

17. In combination with an internal combustion engine comprising the power source of an automotive vehicle and having a lubricating system, a centrifugal lubricant purifier, and purifier driving means deriving its energy from said engine and whereby the ratio of engine speed and acceleration to purifier speed and acceleration may vary.

18. In combination with an internal combustion engine having a lubricating system, means separate from and driven from said engine for finely dispersing lubricant of said system into a mist-like form, means for supplying heat of said engine to said lubricant while it exists in such finely divided state and thereby evaporating from the oil low boiling contaminating substances, and means for returning to said system oil so treated.

19. In combination with an internal combustion engine having a lubricating system, a centrifugal for removing immiscible substances from lubricant of said system and dispersing the lubricant in finely divided particles, and means for evaporating contaminating miscible or soluble substances from the lubricant so dispersed.

20. In combination with an internal combustion engine having a lubricating system, means for removing immiscible substances from lubricant of said system and dispersing the lubricant in finely divided particles, and means for evaporating miscible or soluble contaminating substances from the lubricant so dispersed.

21. In a centrifugal machine, a centrifugal bowl of the type whereby solid contaminating substances are removed from a liquid and the liquid so purified is discharged in a finely divided state, a chamber into which the dispersed liquid is discharged, and means for evaporating contaminating substances from the liquid comprising means for flowing gas into contact with the liquid so dispersed.

22. In combination with an internal combustion engine having a lubricating system, a purifier, a motor for operating the purifier, and means for simultaneously controlling said motor and flow of lubricant from said system to said purifier.

23. In combination with an internal combustion engine operable at variable speed, a lubricant reservoir, a centrifugal lubricant purifier, a pump for passing lubricant from said reservoir to said purifier, and means whereby said pump and purifier are operated by energy derived from the engine and said purifier is operated at substantially uniform speed.

24. In combination with an internal combustion engine having a lubricating system and having an electrical system including a storage battery, a centrifugal purifier for the lubricant in said system, connections between said lubricating system and said purifier for conducting lubricant from said lubricating system to said purifier and returning it to said lubricating system, a motor for operating said purifier at substantially constant speed, and electrical connections between said motor and said battery.

25. In the purification of lubricant of the lubricating system of an internal combustion engine the process which consists in centrifugally treating the lubricant, while it retains the heat of the engine and liquids of low viscosity and boiling point, to remove heavier contaminating substances therefrom and to disperse it in finely divided particles, and then bringing relatively large quantities of gas at or above atmospheric temperature into contact with said particles to evaporate the liquids of low viscosity and boiling point.

26. The method of centrifugally treating a substance which comprises subjecting the substance to the action of centrifugal force and thereby effecting a desired change and discharging the substance in a finely divided state, and maintaining a flow of suitable gas into which the substance is so discharged and thereby controlling alteration of the substance due to its contact with such gas while the substance is in such finely divided state.

27. In the purification of lubricant of the lubricating system of an internal combustion engine the process which comprises withdrawing from the system a portion of the lubricant therein, centrifugally treating the withdrawn lubricant to remove heavier contaminating substances therefrom and to disperse the lubricant in finely divided particles, and flowing into contact with the lubricant so dispersed relatively large quantities of gas suitable to effect a desired change in the lubricant.

28. In the purification of lubricant of the lubricating system of an internal combustion engine the process which consists in withdrawing a fraction of the lubricant of said system, centrifugally treating said fraction to remove heavier contaminating substances therefrom, bringing relatively large quantities of gas into contact with the lubricant to evaporate contaminating substances of lower boiling point, and returning said fraction to the system.

29. In the refining of liquids the process consisting in centrifugally removing certain contaminating substances therefrom and centrifugally discharging the liquid so purified and thereby dispersing the liquid into mist-like form, and maintaining a flow of gas in contact with the liquid so finely dispersed to effect removal or treatment of other contaminating substances.

30. In the refining of liquids the process consisting in centrifugally discharging the liquid in fine separate particles and bringing relatively large quantities of an active gaseous agent into contact with the liquid so dispersed to effect treatment of the liquid by said agent while the liquid is so dispersed.

31. In the purification of lubricant of the lubricating system of an internal combustion engine the process which consists in heating air from said engine and passing it through the lubricant while the lubricant is in mist-like form and retains the heat of the engine to evaporate lower boiling contaminating substances at a temperature below the boiling point of said substances at atmospheric temperature.

32. In the purification of lubricant of the lubricating system of an internal combustion engine the process consisting in dispersing the lubricant in mist-like form and supplying heat from the engine to such particles to effect evaporation of contaminating constituents.

33. In the refining of lubricant of the lubricating system of an internal combustion engine, the process consisting in centrifugally removing certain contaminating substances from the lubricant, and thereby dispersing the lubricant in finely divided particles in a gas to effect evaporation therefrom of other contaminating substances.

34. In the purification of lubricant of the lubricating system of an internal combustion engine the process consisting in withdrawing lubricant from said system, dispersing the withdrawn lubricant in mist-like form in a gas to effect evaporation therefrom of contaminating constitutents, collecting the particles, and returning the lubricant to said system.

35. In combination with an internal combustion engine having a lubricating system, centrifugal means for removing certain contaminating substances from the lubricant of said system and dispersing the lubricant in finely divided particles in a gas to effect evaporation of other contaminating constituents therefrom, and means for collecting said particles and returning the lubricant to said system.

36. In combination, centrifugal means for removing certain contaminating substances from a liquid and dispersing the liquid in a finely divided state in a gas to effect evaporation of other contaminating constituents therefrom, and means for collecting the particles so dispersed.

37. In combination with an internal combustion engine having a lubricating system, a chamber, a rapidly rotating member separate from said engine and driven therefrom, means for withdrawing lubricant from said system and feeding it to said member to effect dispersion of the lubricant into mist-like form as it is thrown therefrom, means separate from said engine for flowing gas through said chamber, and means for returning to said system lubricant collected in said chamber.

38. In combination with an internal combustion engine comprising the power source of an automotive vehicle and having a lubricating system, a centrifugal rotor of the type whereby solid impurities are retained within the rotating rotor and oil is discharged therefrom in mist-like form into the surrounding air, means for driving said rotor at a speed substantially independent of the speed of said engine, means for feeding lubricant of said system to said rotor, and means for returning to said system oil discharged from said rotor.

39. In combination with an internal combustion engine comprising the power source of an automotive vehicle and having a lubricating system, means for withdrawing lubricant from said system, a chamber exterior to the confines of said engine, rotor rotating means associated with said chamber and driven from said engine and at a speed substantially independent of the speed thereof, a replaceable rotor in said chamber and having a driving connection with said rotating means and receiving lubricant so withdrawn and separating therefrom and retaining immiscible impurities while discharging lubricant into the surrounding air, and means for collecting and returning to said system lubricant so discharged.

In testimony whereof, we have signed our names to this specification.

PHILIP T. SHARPLES.
LEO D. JONES.